US011386796B2

United States Patent
Lepron et al.

(10) Patent No.: US 11,386,796 B2
(45) Date of Patent: Jul. 12, 2022

(54) METHOD FOR GENERATING A THREE-DIMENSIONAL REPRESENTATION OF A TERRAIN OVERFLOWN BY AN AIRCRAFT AND ASSOCIATED COMPUTER PROGRAM PRODUCT AND ELECTRONIC DEVICE

(71) Applicant: Thales, Courbevoie (FR)

(72) Inventors: Nicolas Lepron, Merignac (FR); Emmanuel Monvoisin, Merignac (FR); Guillaume Labarthe, Merignac (FR)

(73) Assignee: THALES, Courbevoie (FR)

( * ) Notice: Subject to any disclaimer, the term of this patent is extended or adjusted under 35 U.S.C. 154(b) by 382 days.

(21) Appl. No.: 16/714,449

(22) Filed: Dec. 13, 2019

(65) Prior Publication Data
US 2020/0193850 A1    Jun. 18, 2020

(30) Foreign Application Priority Data
Dec. 17, 2018    (FR) ...................................... 18 73048

(51) Int. Cl.
*G05D 1/00* (2006.01)
*G08G 5/04* (2006.01)
(Continued)

(52) U.S. Cl.
CPC .......... *G08G 5/045* (2013.01); *G05D 1/0016* (2013.01); *G05D 1/042* (2013.01); *G05D 1/106* (2019.05);
(Continued)

(58) Field of Classification Search
CPC ...... G08G 5/045; G08G 5/0043; G05D 1/106; G05D 1/0016; G05D 1/042; G05D 1/00;
(Continued)

(56) References Cited

U.S. PATENT DOCUMENTS 3,375,353 A * 3/1968 Rossoff ...................... G01S 7/20
                                                                342/191
7,098,913 B1* 8/2006 Etherington ............ G06T 15/50
                                                                345/589
(Continued)

FOREIGN PATENT DOCUMENTS

EP    2846133 A1    3/2015
FR    2996672 A1    4/2014
(Continued)

OTHER PUBLICATIONS

Corwin et al., "Synthetic Terrain Imagery for Helmet-Mounted Display," XP055064820 vol. 1, pp. 6-15, (1994).
French Search Report issued by the French Patent Office in corresponding French Application No. FR 1873048, dated Oct. 16, 2019.

*Primary Examiner* — Shardul D Patel
(74) *Attorney, Agent, or Firm* — ArentFox Schiff LLP

(57) ABSTRACT

The invention relates to a method for developing a three-dimensional representation of a terrain overflown by an aircraft able to be piloted by a pilot via a control station.

The method includes for representation of at least one current terrain element, following steps:
- determining a first distance between a first terrain element and the aircraft;
- determining a second distance between a second terrain element and the aircraft; and
- calculating a resultant display intensity of the current terrain element as a function of a difference between the first distance and the second distance.

10 Claims, 5 Drawing Sheets

(51) Int. Cl.
  *G05D 1/10* (2006.01)
  *G05D 1/04* (2006.01)
  *G06T 17/10* (2006.01)
  *G06T 17/20* (2006.01)
  *G08G 5/00* (2006.01)

(52) U.S. Cl.
  CPC .............. *G06T 17/10* (2013.01); *G06T 17/20* (2013.01); *G08G 5/0043* (2013.01)

(58) Field of Classification Search
  CPC ......... G06T 17/10; G06T 17/20; G06T 17/05; G01C 23/00; B64D 43/00
  USPC ............................................................ 701/3
  See application file for complete search history.

(56) References Cited

U.S. PATENT DOCUMENTS

| | | | |
|---|---|---|---|
| 7,675,461 B1* | 3/2010 | McCusker | G01S 7/20 340/963 |
| 2015/0145704 A1* | 5/2015 | Dahan | G09B 9/30 340/971 |
| 2016/0171758 A1* | 6/2016 | Dominici | G06T 15/50 345/419 |

FOREIGN PATENT DOCUMENTS

| | | |
|---|---|---|
| FR | 3009414 A1 | 2/2015 |
| FR | 3030092 A1 | 6/2016 |
| FR | 3037645 A1 | 12/2016 |

\* cited by examiner

METHOD FOR GENERATING A THREE-DIMENSIONAL REPRESENTATION OF A TERRAIN OVERFLOWN BY AN AIRCRAFT AND ASSOCIATED COMPUTER PROGRAM PRODUCT AND ELECTRONIC DEVICE

CROSS-REFERENCE TO RELATED APPLICATIONS

This application is a U.S. non-provisional application claiming the benefit of French Application No. 18 73048, filed on Dec. 17, 2018, which is incorporated herein by reference in its entirety.

FIELD OF THE INVENTION

The present invention relates to a method for developing a three-dimensional representation of a terrain overflown by an aircraft able to be piloted by a pilot via a control station.

The invention also relates to a non-transitory computer-readable medium including a computer program including software instructions which, when executed by a computer, implement such a generating method.

The invention also relates to an electronic device for generating a three-dimensional representation of a terrain overflown by an aircraft.

BACKGROUND

The invention in particular relates to the field of the three-dimensional representation of a terrain on a display system, which makes it possible to project the representation on a transparent surface placed in front of the pilot. The representation is then for example in conformal view. Conformal representation refers to a cartographical representation that is perfectly superimposed on the terrain actually seen by the pilot. This type of representation is particularly used in aeronautics so as to facilitate piloting through poor visibility or at night.

The invention more particularly relates to a helicopter, while being applicable to any type of aircraft, such as an airplane, a helicopter or a drone.

Various methods for generating representations of the terrain overflown by an aircraft are already known in the state of the art.

One conventional approach consists of representing the overflown terrain in the form of a simple gridding. The perception of the distance is then done by the size of the geometric elements of the gridding. This approach is particularly adapted to flat terrain, but is not fully satisfactory for uneven terrain.

Other approaches, such as the break of slope method described for example in document EP 2,846,133 A1, or the peak line method as described in document FR 2,996,672 A1, allow an improved representation of uneven zones, but unlike gridding, are not suitable for representing flat terrain.

Additionally, these aforementioned approaches tend to overload the pilot's field of view, and thus to at least partially conceal the terrain visible by the pilot. Lastly, none of these aforementioned approaches make it possible to distinguish the water zones from the land zones.

SUMMARY

The aim of the invention is then to propose a method for generating an improved three-dimensional representation of the terrain for the pilot irrespective of the typology of the terrain, while guaranteeing a better view of the terrain by the pilot.

To that end, the invention relates to a method for generating a three-dimensional representation of a terrain overflown by an aircraft able to be piloted by a pilot via a control station, the control station comprising an at least partially transparent display screen and a sensor capable of determining an orientation direction of the head of the pilot, the orientation direction being associated with a predetermined solid angle defining a field of view, the display screen being suitable for displaying the three-dimensional representation and being positioned at least partially in the field of view, the method including, for a representation of at least one current terrain element included in the field of view, the following steps:

determining a first distance between a first terrain element and the aircraft, a representation of the first terrain element being included in the field of view and the first terrain element being located in a vicinity of the current terrain element;

determining a second distance between a second terrain element and the aircraft, a representation of the second terrain element being included in the field of view, separate from the first terrain element and the second terrain element being located in the vicinity of the current terrain element; and calculating a resultant display intensity of the current terrain element as a function of a difference between the first distance and the second distance.

Thus, with the generating method according to the invention, it is possible to determine the slope inversions of the overflown terrain more easily and thus to detect the peaks in the mountainous zones of the terrain as well as the water zones and lakes, for example.

Indeed, the difference between the first distance and the second distance when the terrain element is located in a terrain zone with a small slope variation is less significant than when the terrain element is located in a slope inversion zone, such as near a peak, for example. The generating method according to the invention thus makes it possible to discriminate more easily between the breaks of slope on the one hand, and the flat zones, such as the water zones, on the other hand.

The resultant display intensity being a function of these breaks of slope, the method according to the invention offers a better display of information on the display screen so as not to clutter the field of view of the pilot.

According to other advantageous aspects of the invention, the generating method comprises one or more of the following features, considered alone or according to all technically possible combinations:

the display screen comprises a plurality of boxes arranged in matrix form, the current terrain element being associated with a current box through which the representation of the current terrain element is visible along the field of view, the first terrain element being associated with a first box through which the representation of the first terrain element is visible along the field of view, the first box being separate from the current box, the second terrain element being associated with a second box through which the representation of the second terrain element is visible along the field of view, the second box being separate from the current box, the first box and the second box being located on either side of the current box;

the first box and the second box are each adjacent to the current box, and the first box and the second box are symmetrical to one another relative to the current box;

the resultant intensity is further a decreasing and continuous function of a projected distance, on the terrain and along an axis-A orthogonal to a vertical direction-B, between the current terrain element and the aircraft;

the resultant intensity is an increasing and continuous function of an altitude of the aircraft relative to the terrain;

the method comprises a step for calculating an intermediate intensity as a function of the difference between the first distance and the second distance, the step for calculating the resultant intensity comprising a step for filtering the intermediate intensity by assigning a nil value to the resultant intensity when the intermediate intensity is below a first filtering threshold;

the method comprises a step for calculating an intermediate intensity as a function of the difference between the first distance and the second distance, the step for calculating the resultant intensity comprising a step for accentuating the intensity by assigning the resultant intensity a value higher than the intermediate intensity when the intermediate intensity is above an upper threshold and assigning the resultant intensity a value lower than the intermediate intensity when the intermediate intensity is below a lower threshold;

the method comprises a step for calculating an intermediate intensity as a function of the difference between the first distance and the second distance, the step for calculating the resultant intensity comprising, for each terrain element located at a distance from the aircraft below a first distance threshold, at least one step chosen from the group consisting of: assigning a nil value to the resultant intensity; assigning a value lower than the intermediate intensity to the resultant intensity and filtering the intermediate intensity by assigning a nil value to the resultant intensity when the intermediate intensity is below a second filtering threshold; and the step for calculating the resultant intensity comprises, for each terrain element located at a distance from the aircraft greater than a second threshold distance, a step for assigning a nil value to the resultant display intensity.

The invention also relates to a non-transitory computer-readable medium including a computer program including software instructions which, when executed by a computer, implement a generating method as defined above.

The invention also relates to an electronic device for generating a three-dimensional representation of a terrain overflown by an aircraft able to be piloted by a pilot via a control station, the control station comprising an at least partially transparent display screen and a sensor capable of determining an orientation direction of the gaze of the pilot, the orientation direction [being] associated with a predetermined solid angle defining a field of view, the display screen being suitable for displaying the three-dimensional representation and being positioned at least partially in the field of view, the device including: a determining module configured to determine, for a representation of at least one current terrain element included in the field of view, a first distance between a first terrain element and the aircraft and a second distance between a second terrain element and the aircraft, a representation of the first terrain element and the second terrain element being included in the field of view, the first terrain element and the second terrain element being located within a vicinity of the current terrain element, the second terrain element being separate from the first terrain element; and a calculating module configured to calculate a resultant display intensity of the current terrain element as a function of a difference between the first distance and the second distance.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Hereinafter, the term "vertical" is to be understood generally relative to the direction of the gravitational force. The term "horizontal" is to be understood generally as perpendicular to the vertical direction.

Figure 1:
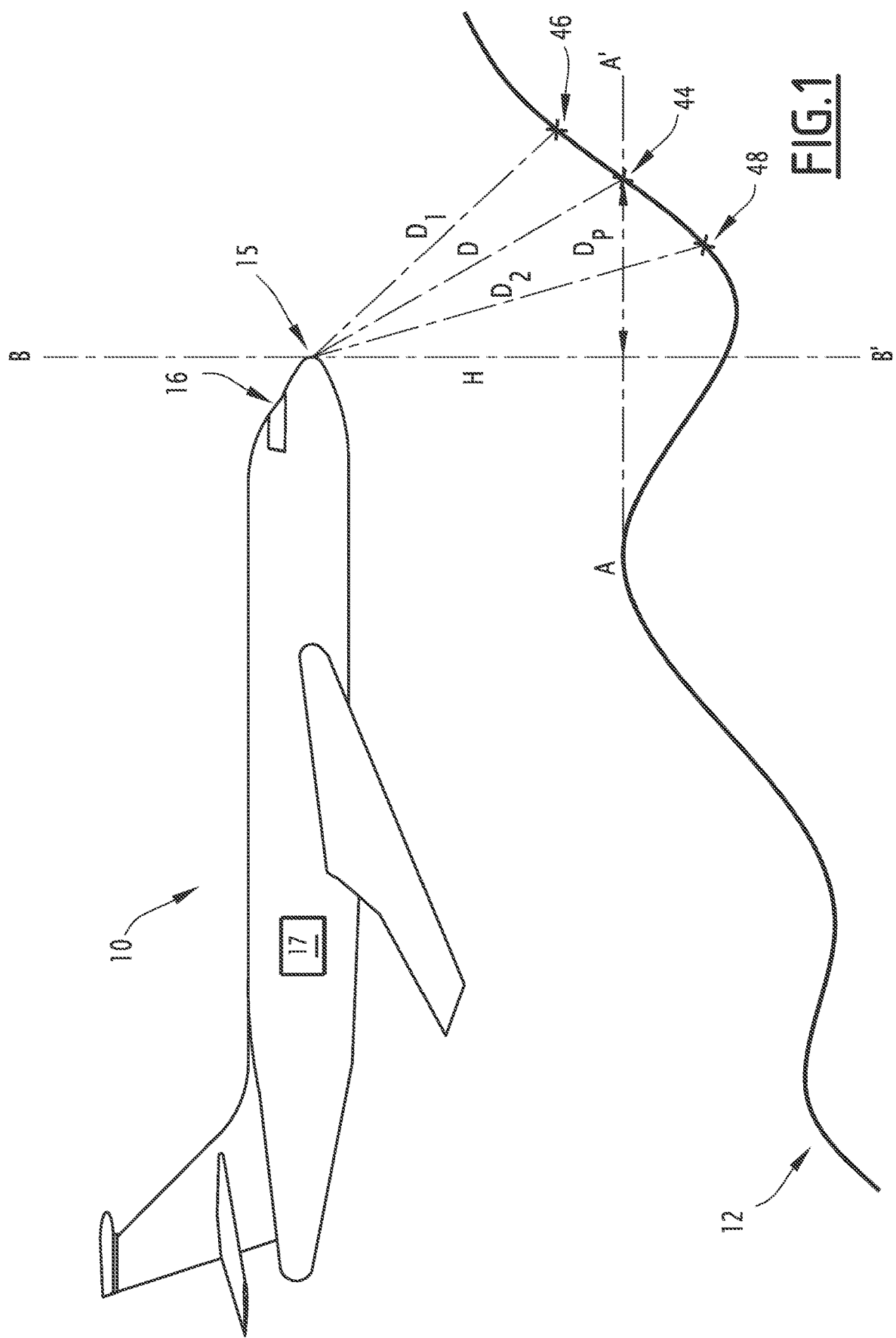
FIG. 1 is a schematic view of an aircraft overflying a terrain.

An aircraft 10 overflying a terrain 12 is shown in FIG. 1. The terrain 12 is for example an expanse of land, such as a plane, a mountainous zone, or an urban zone (town, industrial zone), or a body of water, such as a lake or sea.

The aircraft 10 is for example an airplane, helicopter or drone. In other words, the aircraft 10 is a flying vehicle able to be piloted by a pilot 14 from a control station 16, the control station 16 being arranged inside the aircraft 10 or remotely with respect to the aircraft, in particular in the case of a drone.

The aircraft 10 has a nose 15 forming the front part of the fuselage of the aircraft 10. The aircraft 10 comprises at least one embedded sensor 17 able to determine geographical position of the aircraft 10 and its orientation. In particular, the orientation of the aircraft 10 is defined by the three spatial orientations of the aircraft 10, known as the roll, pitch and yaw by one skilled in the art. Each embedded sensor 17 is for example a GPS sensor, an altimeter, an inertial unit, a gyroscope, a radar probe or a Doppler effect probe.

In a variant, the aircraft 10 comprises at least two embedded sensors 17, each embedded sensor 17 being able to supply information regarding the geographical position of the aircraft 10. The geographical position of the aircraft 10 is determined by the combination of the information from at least two embedded sensors 17.

Figure 2:
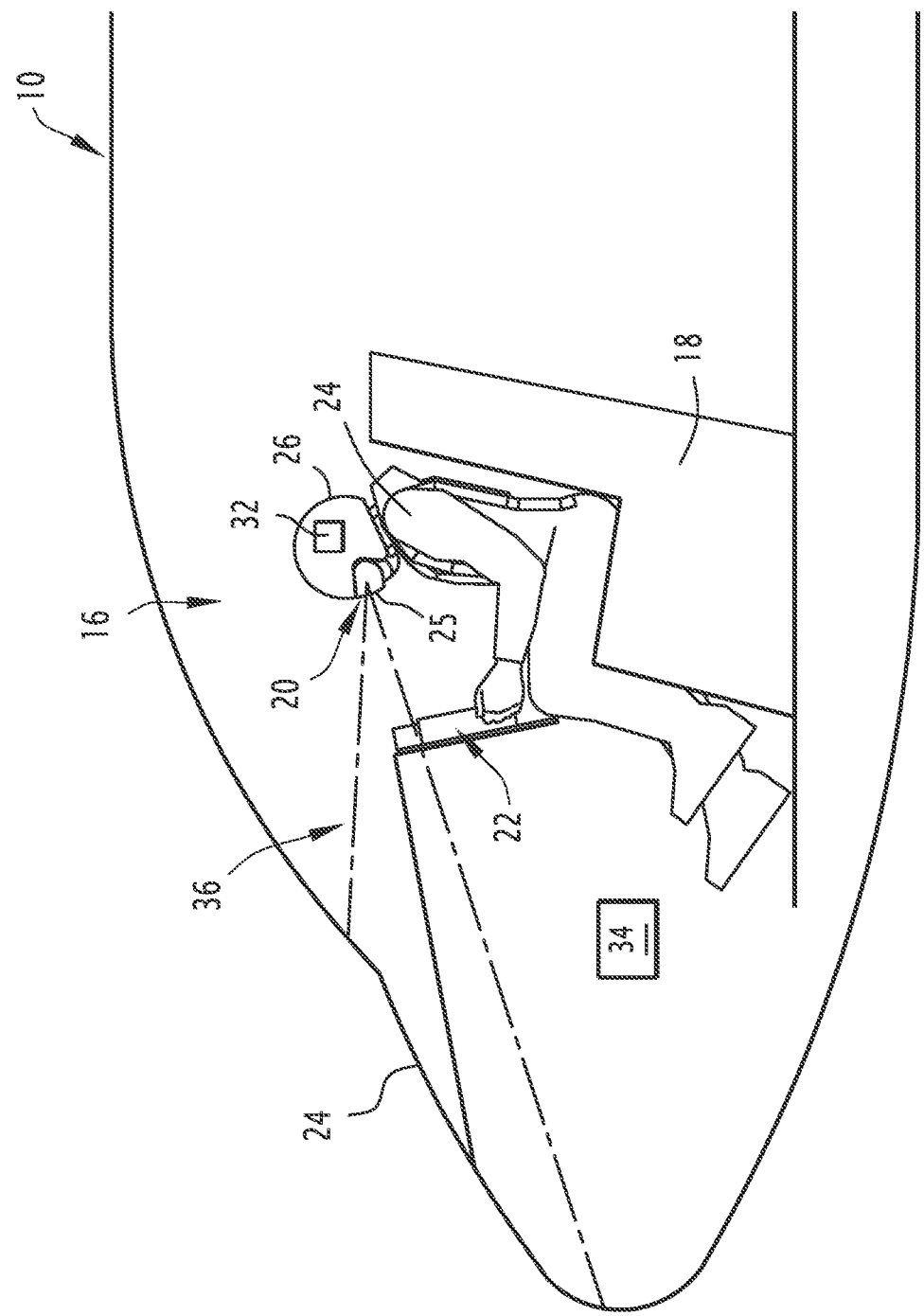
FIG. 2 is a schematic side view of a cockpit of the aircraft of FIG. 1.

Here, the control station 16 is a cockpit of the aircraft 10. As shown in FIG. 2, the control station 16 includes at least one seat 18 for the pilot 14, at least one head-up display screen 20, advantageously at least one head-down display screen 22, and an at least partially transparent windshield 24 separating the inside of the cockpit from the outside environment of the aircraft 10.

The head-up display screen 20 is at least partially transparent. Advantageously, the head-up display screen 20 is a visor 25 integrated into a helmet 26 able to be worn by the pilot 14, as shown in FIG. 2. In a variant, the head-up display screen 20 is a transparent surface fastened in the cockpit and placed in front of the pilot 14.

Figure 3:
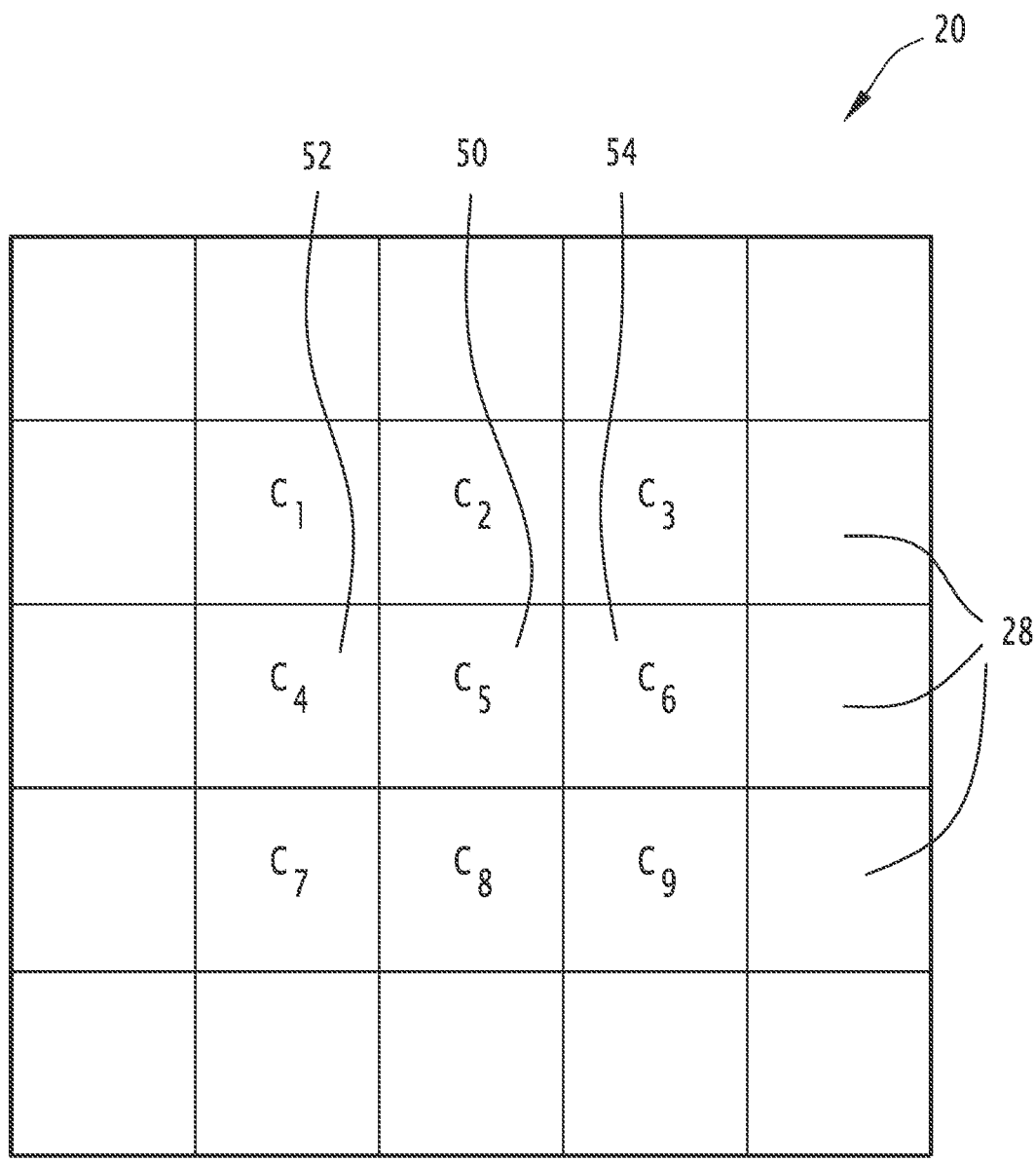
FIG. 3 is a schematic view of a head-up display screen.

Advantageously, as shown in FIG. 3, the head-up display screen 20 comprises a plurality of boxes 28 positioned in matrix form. Each box 28 is for example a pixel. The head-up display screen 20 for example comprises at least 4.8 megapixels.

The head-down display screen 22 is a surface configured to display at least one image. Advantageously, the head-down display screen 22 is configured to display information relative to the aircraft 10, such as the speed, the altitude, the orientation of the aircraft 10 and/or information relative to the outside environment of the aircraft 10, such as air traffic information and weather conditions around the aircraft 10.

According to another exemplary embodiment, not shown, the aircraft 10 is a drone able to be piloted remotely via a control station 16, for example land-based, from which the piloting of the drone is done. The control station 16 here includes at least the seat 18 of the pilot 12 and the head-up display screen 20, advantageously the at least one head-down display screen 22 and at least one environment display screen, not shown. The environment display screen is configured to display the outside environment of the aircraft 10 filmed from at least one camera embedded in the drone.

The control station 16 further comprises an orientation sensor 32 and an electronic device 34 for generating a three-dimensional representation of the terrain 12 overflown by the aircraft 10.

The orientation sensor 32 is able to determine an orientation direction of the gaze of the pilot 14. As shown in FIG. 2, the orientation direction associated with a predetermined solid angle defines a field of view 36.

The head-up display screen 20 is suitable for being positioned at least partially in the field of view 36.

The orientation sensor 32 is for example an accelerometer positioned in the headset 26 of the pilot 14 and able to determine the posture of the head of the pilot 14 from measured accelerations of the headset 26. The orientation sensor 32 is thus able to determine the orientation direction from the posture of the head of the pilot 14 and the orientation of the aircraft 10 received by the at least one embedded sensor 17 in the aircraft 10.

In a variant, the orientation sensor 32 is an electromagnetic sensor able to determine the posture of the head of the pilot 14 from disturbances of a magnetic field due to the movement of the head of the pilot 14, using a technique well known by those skilled in the art and for example embedded in TopOwl® headsets.

The three-dimensional representation of the overflown terrain 12 is a synthetic cartographical representation shown in conformal view. Conformal representation refers to a cartographical representation that is superimposed on the terrain 12 visible by the pilot 14. In the example of the drone, the conformal representation is a cartographical representation that is superimposed on the terrain visible by the pilot 14, this representation of the terrain typically being displayed on the environment display screen.

The electronic generating means 34 comprises a determining module 38, a calculating module 40 and advantageously a display module 42.

The determining module 38 is configured to determine, for a representation of at least one current terrain element 44 included in the field of view 36, a first distance D1 between a first terrain element 46 and the aircraft 10. Distance relative to the aircraft 10 refers to the distance with respect to a predetermined stationary element of the aircraft 10 such as the nose 15 of the aircraft 10, for example, as shown by reference D in FIG. 1.

The representation of a terrain element 12 is directly the terrain element 12 visible through the windshield 24 of the aircraft 10 when the control station 16 is arranged in the aircraft 10. When the control station 16 is located at a distance from the aircraft 10, like in the example of the drone, the representation of the terrain element 12 is the image of the terrain element 12 displayed on the environment display screen in the control station 16.

The representation of the first terrain element 46 is included in the field of view 36, and the first terrain element 46 is located in a vicinity of the current terrain element 44. Vicinity of the current element 44 refers to a zone located at a distance of less than 30 m, advantageously less than 50 cm.

In one advantageous embodiment, as shown in FIG. 3, the current terrain element 44 is associated with a current box 50 among the boxes 28 of the head-up display screen 20, through which the representation of the current terrain element 44 is visible along the field of view 36. Vicinity of the current element 44 then refers to a zone associated with the set of boxes 28 located at a distance of less than five boxes 28, in particular less than two boxes 28 from the current box 50. The distance from a box 28 to the current box 50 is defined as the minimum number of boxes separating said box 28 from the current box 50 along the horizontal or vertical axis of the display screen 20.

The determination of the distance D between a respective terrain element and the aircraft 10 is for example done from a radar or lidar embedded in the aircraft 10. In a variant, the determination of the distance between a respective terrain element and the aircraft 10 is done via a cartographical database of the terrain 12 embedded in the aircraft 10. In particular, the cartographical database comprises the geographical coordinates of the terrain element thus making it possible, from these coordinates of the terrain element and the position of the aircraft 10, measured by the at least one embedded sensor 17, to determine the distance D between the terrain element and the aircraft 10.

The determining module 38 is further configured to determine, for the representation of the current terrain element 44 included in the field of view 36, a second distance D2 between a second terrain element 48 and the aircraft 10. The representation of the second terrain element 48 is included in the field of view 36, and the second terrain element 48 is located in a vicinity of the current terrain element 44.

Advantageously, the determining module 38 is configured to determine, for a representation of at least one current terrain element 44 included in the field of view 36, more than two distances between different terrain elements 12 and the aircraft 10. The representation of each terrain element is included in the field of view 36, and each terrain element is located in a vicinity of the current terrain element 44.

In one advantageous embodiment, as shown in FIG. 3, the first terrain element 46 is associated with a first box 52, through which the representation of the first terrain element 46 is visible along the field of view 36. The first box 52 is separate from the current box 50.

The second terrain element 48 is associated with a second box 54, through which the representation of the second terrain element 48 is visible along the field of view 36. The second box 54 is separate from the current box 50.

The first box 52 and the second box 54 are for example located on either side of the current box 50. "On either side of" means that the first box 52 and the second box 54 are located on one side and the other side with respect to an axis of symmetry of the current box 50, irrespective of the orientation (horizontal, vertical, oblique) of this axis of symmetry.

In FIG. 3, nine boxes 28 have been numbered from c1 to c9. Here, c5 is the current box 50, c4 is the first box 52, and c6 is the second box 54. In this example, the boxes c1 and c8, the boxes c3 and c7, c1 and c7 are considered to be on either side of the box c5.

In one advantageous embodiment, the first box 52 and the second box 54 are each adjacent to the current box 50. In the example of FIG. 3, the boxes c1 to c4 and c6 to c9 are adjacent to the box c5.

Additionally, the first box 52 and the second box 54 are symmetrical to one another relative to the current box 50. In the example of FIG. 3, the boxes c1 and c9, c2 and c8, c3 and c7, and c4 and c6 are symmetrical to one another relative to the box c5.

The calculating module 40 is configured to calculate a resultant display intensity of the current terrain element 44 as a function of a difference between the first distance D1 and the second distance D2.

In other words, one skilled in the art will understand that the calculation of a resultant display intensity of the current terrain element 44 as a function of a difference between the first distance D1 and the second distance D2 is a calculation of the resultant display intensity of the current terrain element 44 as a function of a property Δ, this property Δ being equal to the difference between the first distance D1 and the second distance D2. In still other words, the resultant display intensity of the calculated current terrain element 44 is a function of said property Δ.

In particular, the calculating module 40 is configured to calculate a first coefficient Wn as a function of a difference between the first distance D1 and the second distance D2, the resultant display intensity of the current terrain element 44 being a function of the coefficient Wn.

This distance difference calculation of the aircraft 10 allows an easy determination of the slope inversions of the terrain 12. Thus, the pilot 14 more easily detects one or several peaks in the mountainous zones of the terrain 12 as well as in water zones such as lakes, for example. Indeed, the difference between the first distance D1 and the second distance D2 when they terrain element 12 is located in a terrain zone 12 with a small slope variation is less significant than when the terrain element 12 is located in a slope inversion zone, such as near a peak, for example.

The resultant display intensity being a function of these breaks of slope, the calculation of the coefficient Wn allows a better display of information on the head-up display screen 20 so as not to clutter the field of view of the pilot 14.

In the embodiment in which the determining module 38 is configured to determine more than two distances between different terrain elements and the aircraft 10, the calculating module 40 is configured to calculate the coefficient Wn as a function of several distance differences between different terrain elements and the aircraft 10. In particular, the determining module 38 is configured to calculate the distance between the aircraft 10 and each of the terrain elements 12 associated with the eight boxes adjacent to the current box 50. The calculating module 40 is configured to calculate the distance difference between the aircraft 10 and each of the pairs of boxes that are symmetrical relative to the current box 50. The calculating module 40 is then configured to calculate the coefficient Wn by taking the average of the four calculated distance differences.

In the example of FIG. 3, the distance between the aircraft 10 and the terrain element 12 associated with a box ci is denoted di, i being an integer from 1 to 9. In particular, in the example of FIG. 3, the distance D between the terrain element and the aircraft 10 corresponds to the distance d5, the first distance D1 corresponds to d4 and the second distance D2 corresponds to d6.

The coefficient Wn is then equal to the average between: the absolute value of (d1-d9) divided by $\sqrt{2}$, the absolute value of (d2-d8), the absolute value of (d3-d7) divided by $\sqrt{2}$ and the absolute value of (d4-d6). Thus, for any pair of boxes (ci, cj) that are symmetrical relative to the current box, $a_{ij}$ being equal to 1 if the pair is oriented along the horizontal or vertical direction and $a_{ij}$ being equal to $1/\sqrt{2}$ if the pair is oriented along an oblique direction:

$$Wn = \text{average}_{(ci,cj)}(\alpha_{ij} \times |di-dj|) \qquad \text{[Math 1]}$$

The use of the absolute value to calculate distances makes it possible to account for the situations in which the roll is greater than 90° or in which the pitch is greater than 90°, for example. Additionally, calculating the coefficient Wn as a function of the three axes makes it possible to account for all of the slope variations of the terrain 12 around the current terrain element 44.

In a variant, the calculating module 40 is configured to calculate the resultant display intensity of the current terrain element 44 by taking the maximum value of the four calculated distance differences. In the example of FIG. 3, the coefficient Wn is then equal to the maximum value among: the absolute value of (d1-d9) divided by $\sqrt{2}$, the absolute value of (d2-d8), the absolute value of (d3-d7) divided by $\sqrt{2}$ and the absolute value of (d4-d6). Thus, for any pair of boxes (ci, cj) that are symmetrical relative to the current box, $a_{ij}$ being equal to 1 if the pair is oriented along the horizontal or vertical direction and $a_{ij}$ being equal to $1/\sqrt{2}$ if the pair is oriented along an oblique direction:

$$Wn = \text{maximum}_{(ci,cj)}(\alpha_{ij} \times |di-dj|) \qquad \text{[Math 2]}$$

Also in a variant, the calculating module 40 is configured to calculate the resultant display intensity Ir of the current terrain element 44 by taking a weighted average of the four calculated distance differences as a function of a predetermined relative significance of each axis.

Additionally, the calculating module 40 is configured to calculate the resultant intensity Ir further according to a decreasing and continuous function of a projected distance Dp, on the terrain 12 and along an axis A-A' orthogonal to a vertical direction B-B', between the current terrain element 44 and the aircraft 10, as shown in FIG. 1.

The projected distance is for example determined by a change of coordinate system by going from the coordinate system specific to the aircraft 10 defined by the altitude and the orientation of the aircraft 10, to a land-based coordinate system related to the terrain 12. By rotation of the axes, knowing the roll, pitch and yaw of the aircraft 10, the calculating module 40 is capable of moving in the coordinate system supplying the altitude of the aircraft 1 and the projected distance.

In particular, the calculating module 40 is configured to calculate a second coefficient Wp according to a decreasing and continuous function of the projected distance, on the terrain 12 and along the orthogonal axis A-A' with respect to the vertical direction B-B', between the current terrain element 44 and the aircraft 10.

The calculating module 40 is configured to calculate the resultant intensity Ir as a function of the multiplication between the two coefficients Wn and Wp.

The module 40 is for example configured to calculate the coefficient Wp according to an inverse function of the projected distance, on the terrain 12 and along the orthogonal axis A-A' with respect to the vertical direction B-B', between the current terrain element 44 and the aircraft 10. In the example of FIG. 1, the coefficient Wp is then equal to 1/Dp.

The application of the coefficient Wp makes it possible to offset the fact that the more the projected distance Dp between the aircraft 10 and the current terrain 44 increases, the more the coefficient Wn will increase due to the distance differences between the aircraft 10 and the neighboring terrain elements 12.

In a variant or additionally, the calculating module 40 is configured to calculate the resultant intensity Ir further according to an increasing and continuous function of an altitude of the aircraft 10 relative to the terrain 12, as shown in FIG. 1. The altitude of the aircraft 10 is defined as the distance along the vertical axis B-B' between the terrain 12 and a predetermined stationary element of the aircraft 10, such as the nose 15 of the aircraft 10, for example, shown by reference H in FIG. 1. In particular, the calculating module 40 is configured to calculate the resultant intensity further according to an increasing and continuous function of the altitude H of the aircraft 10 relative to the terrain 12.

In a variant, the altitude of the aircraft 10 is defined relative to the current terrain element 44. The altitude of the aircraft 10 is then defined as the distance along the vertical axis B-B' between the current terrain element 44 and a predetermined stationary element of the aircraft 10, such as the nose 15 of the aircraft 10.

The module 40 is for example configured to calculate a coefficient Wi as being equal to the altitude of the aircraft 10 relative to the terrain 12. In the example of FIG. 1, the coefficient Wi is then equal to H.

The application of the coefficient Wi makes it possible to compensate for the fact that the more the altitude H of the aircraft 10 relative to the terrain 12 increases, the more the coefficient Wn will decrease due to the crushing of the distance differences between the aircraft 10 and the neighboring terrain elements 12. Additionally, the coefficient Wi contributes additional information making it possible to apply a modulation of the coefficient Wn depending on whether the current terrain element 40 is located at a lower or higher altitude than the altitude of the aircraft 10. An increase in the coefficient Wn for the terrain elements 12 located at an altitude higher than that of the aircraft 10 makes it possible to increase the intensity of the reliefs above the aircraft 10 that are the most dangerous for the continuation of the flight.

The calculating module 40 is for example configured to calculate the resultant intensity as a function of the multiplication between the three coefficients Wn, Wp and Wi.

In a variant or additionally, the calculating module 40 is configured to calculate an intermediate intensity It as a function of the difference between the first distance D1 and the second distance D2, and the calculating module 40 is configured to calculate the resultant intensity Ir by filtering the intermediate intensity It by assigning a nil value to the resultant intensity when the intermediate intensity It is below a first filtering threshold S1. The first filtering threshold S1 is for example less than 80%, in particular between 0% and 15%. Such filtering makes it possible to obtain a less saturated and therefore more readable three-dimensional representation of the terrain 12 for the pilot 14. Filtering with a significant first filtering threshold S1, for example greater than 70%, makes it possible to keep only the peaks and not to display the rest of the terrain 12.

In a variant or additionally, the calculating module 40 is configured to calculate the resultant intensity It by accentuation of the intensity by assigning the resultant intensity Ir a value greater than the intermediate intensity It when the intermediate intensity It is greater than an upper threshold Sh and by assigning the resultant intensity Ir a value less than the intermediate intensity It when the intermediate intensity is below a lower threshold SB. The upper threshold SH is for example between 80% and 100% and the lower threshold SB is for example between 0% and 50%. Such an accentuation makes it possible to increase the contrast and thus allows an improved three-dimensional representation of the terrain 12 for the pilot 14.

In a variant, the calculating module 40 applies a sine function to the intermediate intensity It in order to increase the contrast.

In a variant or additionally as well, the calculating module 40 is configured to calculate the resultant intensity Ir by assigning, for each terrain element located at a distance D from the aircraft 10 smaller than a first threshold distance Ds1, a nil value to the resultant intensity Ir. The first threshold distance Ds1 is for example between 800 m and 5000 m. This filtering makes it possible not to display additional information in the zone close to the aircraft 10 in which the pilot 14 has sufficient visibility so as not clutter the field of view of the pilot 14. Additionally, the precision of the cartographical databases is potentially insufficient to guarantee good conformity of the three-dimensional representation with the terrain 12, such that this filtering makes it possible to avoid a shift between the three-dimensional representation and the terrain 12 that may potentially be problematic for the pilot 14.

In a variant, the calculating module 40 is configured to calculate the resultant intensity Ir by assigning, for each terrain element located at a distance D from the aircraft 10 smaller than the first threshold distance Ds1, the resultant intensity a value below the intermediate intensity It. For example, the calculating module 40 calculates the resultant intensity Ir by decreasing the intermediate intensity It by a multiplier greater than 2.

In a variant, the calculating module 40 is configured to calculate the resultant intensity Ir by filtering, for each terrain element located at a distance D from the aircraft 10 smaller than the first threshold distance Ds1, the intermediate intensity It by assigning a nil value to the resultant intensity Ir when the intermediate intensity It is below a second filtering threshold S2. In particular, the second filtering threshold S2 is greater than the first filtering threshold S1. For example, the second filtering threshold S2 is between 70% and 95%. Thus, the filtering in the zone close to the aircraft 10 is greater, then making it possible not to clutter the field of view close to the pilot 14.

In a variant or additionally as well, the calculating module 40 is configured to calculate the resultant intensity Ir by assigning, for each terrain element 12 located at a distance D from the aircraft 10 greater than a second threshold distance Ds2, a nil value to the resultant intensity Ir. The second threshold distance Ds2 is for example between 2 km and 72 km. Thus, no additional information is displayed in the zone distant from the aircraft 10 so as not to clutter the field of view of the pilot 14 with information that is not relevant because it relates to terrain elements 12 that are far away from the aircraft 10. Such filtering also makes it possible to obtain a clear border between the representation of the terrain 12 and the sky.

In a variant or additionally as well, the calculating module 40 is configured to adjust the resultant intensity Ir associated with the current element 44, following filtering of the intermediate intensity It, as a function of the resultant intensity Ir associated with the terrain elements 12 located in the vicinity of the current element 44. In particular, the calculating module 40 is configured to adjust the resultant intensity Ir such that the resultant intensity difference Ir between two adjacent boxes 28 is less than 20% following a filtering of the intermediate intensity It. For example, the calculating module 40 adjusts the resultant intensity Ir by linearization of the application of the thresholds S1, S2, Ds1, Ds2 for the adjacent elements of the border between two zones. This adjustment thus makes it possible to obtain a more fluid transition between the different displayed zones and thus to have improved viewing comfort of the terrain 12 for the pilot 14.

One skilled in the art will understand that this adjustment is therefore only done at borders between zones defined by the threshold distances Ds1, Ds2 or the filtering thresholds S1, S2, but does not apply to peaks where the resultant intensity difference Ir between boxes 28 may be substantial in order to show these peaks distinctly.

The display module 42 is configured to display, on the head-up display screen 20, the three-dimensional representation of the terrain 12.

In particular, the display module 42 is configured to display the current terrain element 44 with the associated resultant display intensity Ir. In particular, the display module 42 is configured to display the current terrain element 28 with the associated resultant display intensity Ir. For example, the displayed color is green.

Figure 4:
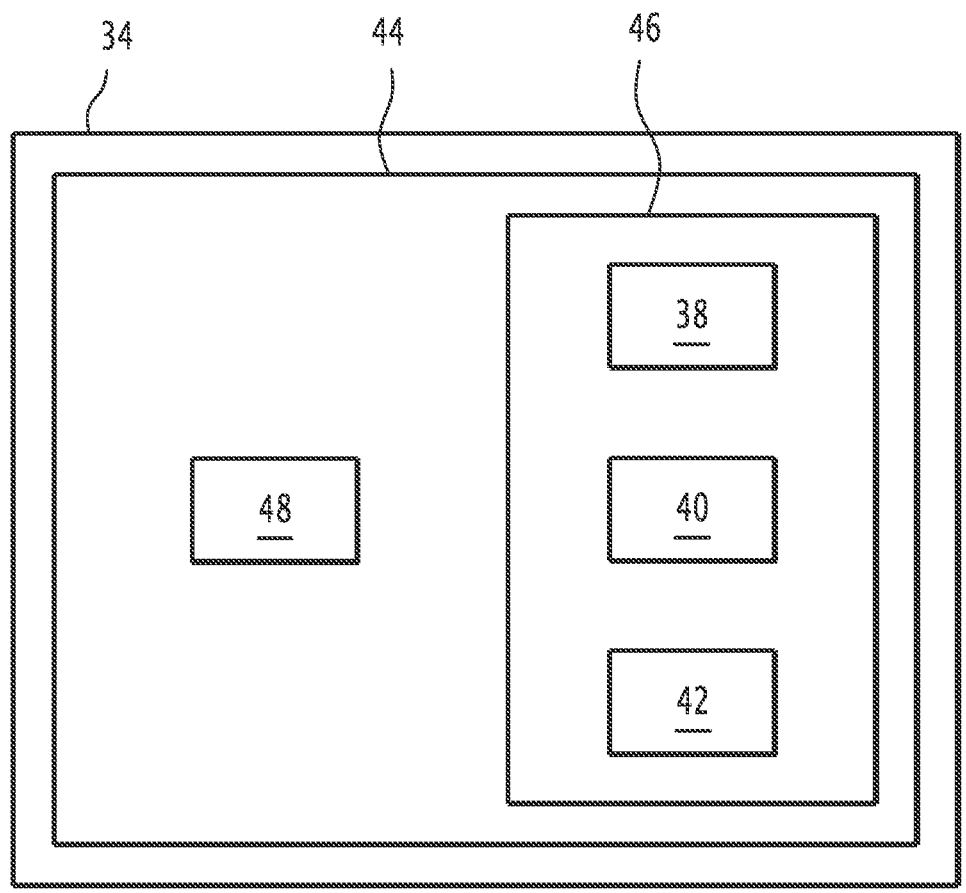
FIG. 4 is a schematic illustration of an electronic generating device according to the invention.

In the example of FIG. 4, the electronic generating device 34 comprises an information processing unit 44, for example made up of a memory 46 and a processor 48 associated with the memory 46. The determining module 38, the calculating module 40 and the display module 42 are each made in the form of software, or a software component, executable by the processor 48. The memory 40 of the electronic generating device 34 is then able to store software for determining a distance between the aircraft 10 and a terrain element 12, resultant intensity calculating software and software for displaying the three-dimensional representation. The processor 48 is then capable of executing each of the software applications from among the determining software, the calculating software and the display software. In a variant, the electronic generating device 34 comprises a plurality of processors 48, at least one of the software applications being able to be executed on at least two processors 48.

In a variant that is not shown, the determining module 38, the calculating module 40 and the display module 42 are each made in the form of a programmable logic component, such as an FPGA (Field Programmable Gate Array), or in the form of a dedicated integrated circuit, such as an ASIC (Application Specific Integrated Circuit).

When the electronic generating device 34 is made in the form of one or several software programs, i.e., in the form of a computer program, it is further able to be stored on a medium, not shown, readable by computer. The computer-readable medium is for example a medium suitable for storing the electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 5:
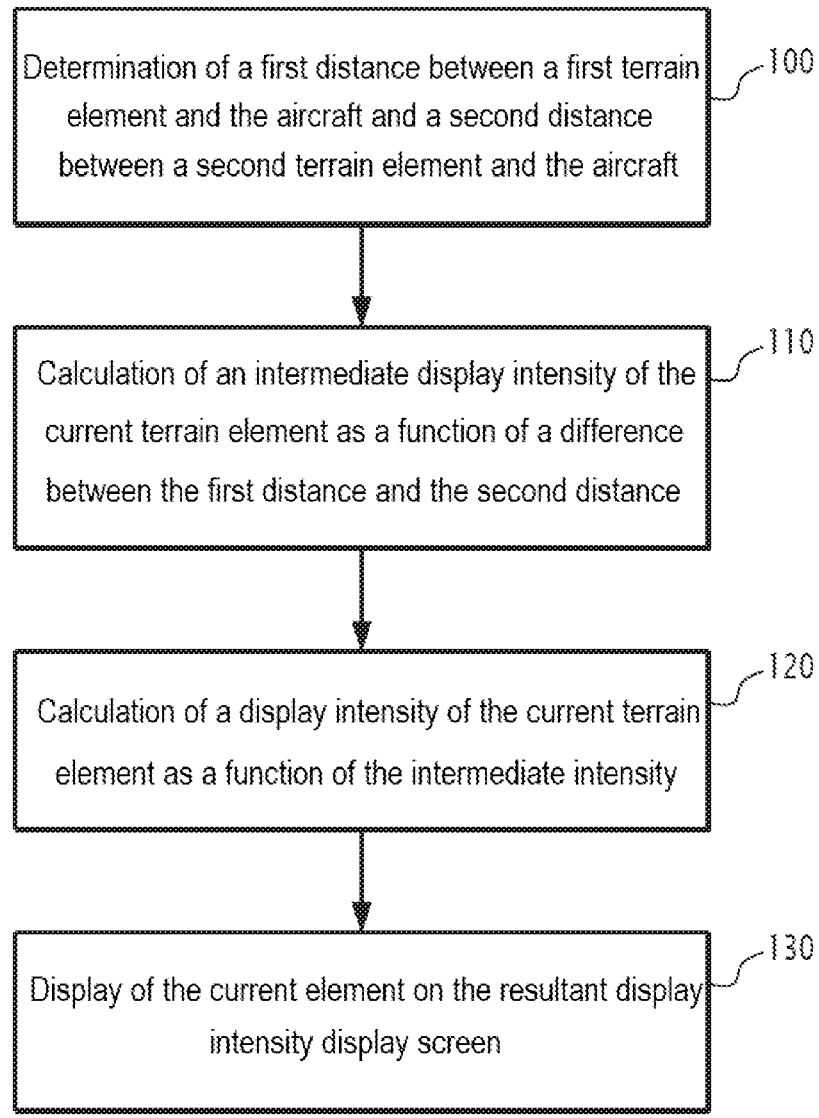
FIG. 5 is a flowchart of a method, according to the invention, for generating a three-dimensional representation of the terrain of FIG. 1.

The operation of the electronic generating device 34 according to the invention will now be explained using FIG. 5, showing a flowchart of the method according to the invention, for generating a three-dimensional representation of a terrain 12 overflown by an aircraft 10, the method being carried out by the electronic generating device 34.

The method is described hereinafter for a current terrain element 44, the representation of which is included in the field of view 34 of the pilot 14 and associated with a current box 50. One skilled in the art will understand that the method is applicable to any element of the terrain 12 in a similar manner.

Initially, as visible in FIG. 1, the aircraft 10 over flies the terrain 12.

During an initial step 100, the method comprises a step for determining the first distance D1 between the first terrain element 46 and the aircraft 10 through the determining module 38.

Then, the determining module 38 determines the second distance D2 between a second terrain element 48 and the aircraft 10.

Advantageously, the determining module 38 determines the distance between the aircraft 10 and each of the terrain elements 12 associated with the eight boxes adjacent to the current box 50.

Then, the method comprises a step 110 for calculating, via the calculating module 40, a resultant display intensity It of the current terrain element 44 as a function of a difference between the first distance D1 and the second distance D2.

Advantageously, the resultant intensity It is further a decreasing and continuous function of a projected distance, on the terrain 12 and along the orthogonal axis A-A' with respect to the vertical direction B-B', between the current terrain element 44 and the aircraft 10.

Also advantageously, the resultant intensity Ir is an increasing and continuous function of an altitude of the aircraft 10 relative to the terrain 12.

In a variant, the resultant intensity Ir is an increasing and continuous function of an altitude of the aircraft 10 relative to the current terrain element 44.

In particular, the calculating module 40 calculates the first coefficient Wn, and advantageously the coefficients Wp and Wi, then determines the resultant intensity Ir by multiplication of these coefficients.

In one particular embodiment, step 110 corresponds to a step for calculating an intermediate intensity It, the intermediate intensity optionally being equal to the resultant intensity Ir.

One skilled in the art will understand that all of the calculating sub-steps during step 110 can be done in any order.

The method next comprises an optional step 120 for filtering the intermediate intensity It by assigning a nil value to the resultant intensity Ir when the intermediate intensity It is below a first filtering threshold S1.

The method further comprises, during step 120, an optional step for accentuation of the intensity by assigning the resultant intensity Ir a value greater than the intermediate intensity It when the intermediate intensity It is greater than the upper threshold Sh and by assigning the resultant intensity Ir a value less than the intermediate intensity It when the intermediate intensity is below the lower threshold SB.

The method further comprises, during step 120, an optional step for calculating the resultant intensity comprising, for each terrain element located at a distance D from the aircraft 10 below a first distance threshold Ds1, at least one step chosen from the group consisting of: assigning a nil value to the resultant intensity Ir; assigning a value lower than the intermediate intensity It to the resultant intensity Ir and filtering the intermediate intensity It by assigning a nil value to the resultant intensity Ir when the intermediate intensity It is below a second filtering threshold S2.

The method further comprises, during step 120, for each terrain element located at a distance from the aircraft 10 greater than a second threshold distance Ds2, an optional step for assigning a nil value to the resultant display intensity Ir.

One skilled in the art will understand that all of the calculating sub-steps during step 120 can be done in any order.

Then, during an optional step 130, the display module 42 displays the current terrain element 40 with the resultant display intensity Ir calculated by the calculating module 40. For example, the display module 42 displays, in the current box 50, a color having the associated resultant intensity.

One can then see that the present invention has a certain number of advantages.

Indeed, the calculation of the resultant intensity Ir by difference in distances from the aircraft 10 allows an easy determination of a slope inversion of the terrain 12. Thus, the generating method according to the invention makes it possible to avoid overloading the field of view of the pilot 14 by displaying an improved three-dimensional representation of the terrain 12 for the pilot 14 irrespective of the typology of the terrain 12, while guaranteeing a better view of the terrain 12 by the pilot 14. The method according to the invention further makes it possible to distinguish water zones from land zones more easily. Indeed, water zones are then shown by a substantially constant intensity, while land zones, due to elevation variations, even small ones, are then shown by a variable intensity.

The calculation of the resultant intensity Ir as a function of the projected distance from the current terrain element 44 to the aircraft 10 makes it possible to compensate for the increase in the coefficient Wn due to the increase in the distance differences between the aircraft 10 and the adjacent terrain elements 12 when the projected distance from the terrain elements 12 to the aircraft 10 increases.

The calculation of the resultant intensity Ir as a function of the altitude of the aircraft 10 makes it possible to compensate for the decrease in the coefficient Wn due to the crushing of the distance differences between the aircraft 10 and the adjacent terrain elements 12 when the altitude of the aircraft 10 increases.

The filtering of the intermediate intensity It as a function of the threshold distances Ds1, Ds2 and the threshold intensities S1, S2, SH, SB makes it possible to provide low-density information, concentrated on the reliefs of the terrain 12 that are most dangerous for short-term flight in the zone where the pilot 14 has good visibility of the terrain 12, while supplying information with a higher density offering a representation of the most significant reliefs in the zone where the pilot 14 has poor visibility of the terrain 12.

Lastly, the filtering in the zone close to the aircraft 10 makes it possible to adapt to the precision of the cartographical database when it is insufficient to guarantee good conformity with the terrain 12 in order to guarantee good viewing and a good representation of the terrain 12 for the pilot 14.

The invention claimed is:

1. A method for generating a three-dimensional representation of a terrain overflown by an aircraft able to be piloted by a pilot via a control station, the control station comprising an at least partially transparent display screen and a sensor capable of determining an orientation direction of a head of the pilot, the orientation direction being associated with a predetermined solid angle defining a field of view, the display screen being suitable for displaying the three-dimensional representation and being positioned at least partially in the field of view, the method including, for a representation of at least one current terrain element included in the field of view, steps:

determining a first distance between a first terrain element and the aircraft, a representation of the first terrain element being included in the field of view and the first terrain element being located in a vicinity of the current terrain element;

determining a second distance between a second terrain element and the aircraft, a representation of the second terrain element being included in the field of view, separate from the first terrain element and the second terrain element being located in the vicinity of the current terrain element;

calculating a resultant display intensity of the current terrain element as a function of a difference between the first distance and the second distance; and displaying the current terrain element with the associated resultant display intensity.

2. The generating method according to claim 1, wherein the display screen comprises a plurality of boxes arranged in matrix form, the current terrain element being associated with a current box through which the representation of the current terrain element is visible along the field of view, the first terrain element being associated with a first box through which the representation of the first terrain element is visible along the field of view, the first box being separate from the current box, the second terrain element being associated with a second box through which the representation of the second terrain element is visible along the field of view, the second box being separate from the current box, the first box and the second box being located on either side of the current box.

3. The generating method according to claim 2, wherein the first box and the second box are each adjacent to the current box, and the first box and the second box are symmetrical to one another relative to the current box.

4. The generating method according to claim 1, wherein the resultant intensity is further a decreasing and continuous function of a projected distance, on the terrain and along an axis orthogonal to a vertical direction, between the current terrain element and the aircraft.

5. The generating method according to claim 1, wherein the resultant intensity is an increasing and continuous function of an altitude of the aircraft relative to the terrain.

6. The generating method according to claim 1, wherein the method comprises a step for calculating an intermediate intensity as a function of the difference between the first distance and the second distance, the step for calculating the resultant intensity comprising a step for filtering the intermediate intensity by assigning a nil value to the resultant intensity when the intermediate intensity is below a first filtering threshold.

7. The generating method according to claim 1, wherein the method comprises a step for calculating an intermediate intensity as a function of the difference between the first distance and the second distance, the step for calculating the resultant intensity comprising a step for accentuating the intensity by assigning the resultant intensity a value higher than the intermediate intensity when the intermediate intensity is above an upper threshold and assigning the resultant intensity a value lower than the intermediate intensity when the intermediate intensity is below a lower threshold.

8. The generating method according to claim 1, wherein the method comprises a step for calculating an intermediate intensity as a function of the difference between the first distance and the second distance, the step for calculating the resultant intensity comprising, for each terrain element located at a distance from the aircraft below a first distance threshold, at least one step chosen from the group consisting of:

assigning a nil value to the resultant intensity;

assigning a value lower than the intermediate intensity to the resultant intensity;

filtering the intermediate intensity by assigning a nil value to the resultant intensity when the intermediate intensity is below a second filtering threshold.

9. A non-transitory computer-readable medium including a computer program product comprising software instructions which, when implemented by a piece of computer equipment, carry out the generating method according to claim 1.

10. A device for generating a three-dimensional representation of a terrain overflown by an aircraft able to be piloted by a pilot via a control station, the control station comprising an at least partially transparent display screen and a sensor capable of determining an orientation direction of a gaze of the pilot, the orientation direction being associated with a predetermined solid angle defining a field of view, the display screen being suitable for displaying the three-dimensional representation and being positioned at least partially in the field of view, the device including:

a memory;

a processor coupled to the memory and configured to:

determine, for a representation of at least one current terrain element included in the field of view, a first distance between a first terrain element and the aircraft and a second distance between a second terrain element and the aircraft, a representation of the first terrain element and the second terrain element being included in the field of view, the first terrain element and the second terrain element being located within a vicinity of the current terrain element, the second terrain element being separate from the first terrain element;

calculate a resultant display intensity of the current terrain element as a function of a difference between the first distance and the second distance; and display the current terrain element with the associates resultant display intensity.

\* \* \* \* \*